H. J. TYNAN.
SHAFT SHIELD.
APPLICATION FILED DEC. 18, 1914.
1,153,467.
Patented Sept. 14, 1915.
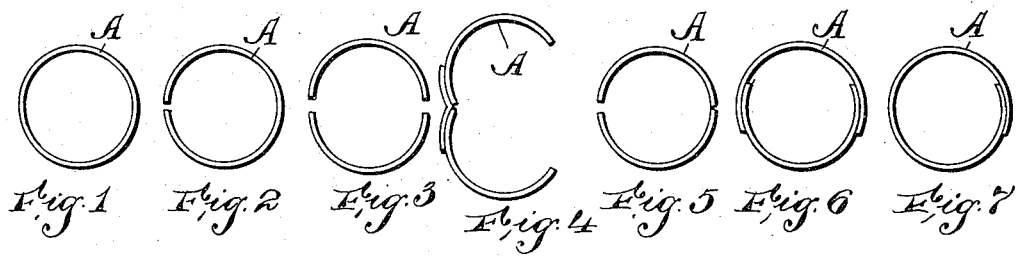
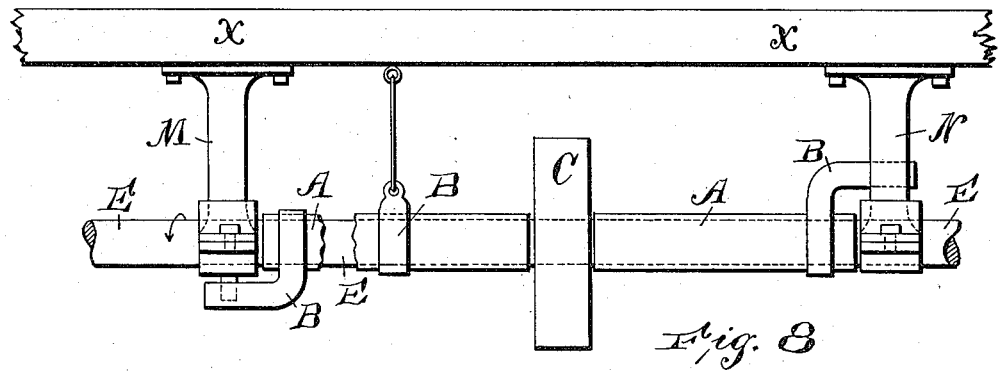
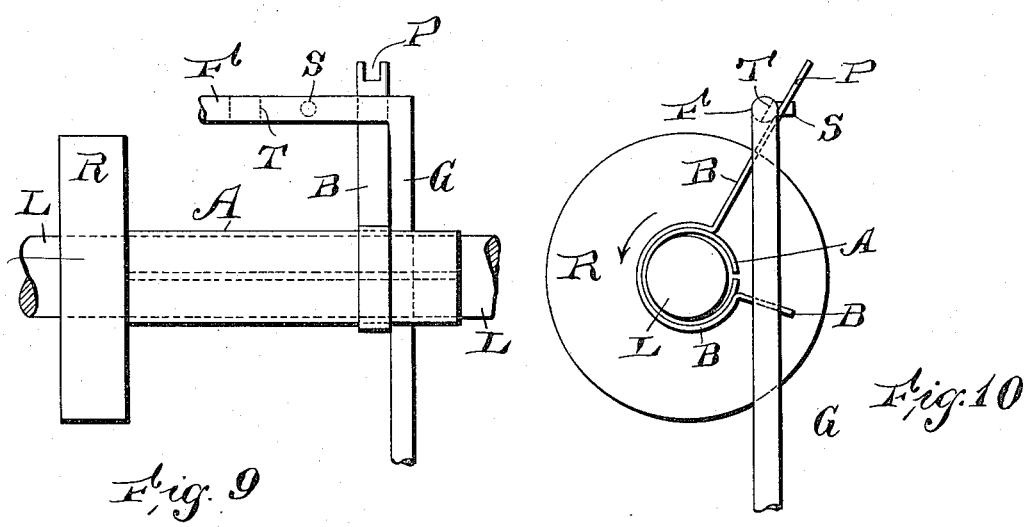
INVENTOR
Henry J. Tynan,
BY
Dyke & Canfield,
ATTORNEYS.

UNITED STATES PATENT OFFICE.

HENRY J. TYNAN, OF PATERSON, NEW JERSEY.

SHAFT-SHIELD.

1,153,467. Specification of Letters Patent. Patented Sept. 14, 1915.

Application filed December 18, 1914. Serial No. 877,913.

*To all whom it may concern:*

Be it known that I, HENRY J. TYNAN, a citizen of the United States, residing at Paterson, in the county of Passaic and State of New Jersey, have invented a new and useful Improvement in Shaft-Shields, of which the following is a specification.

My invention relates to the shielding of shafts, revolving or designed to be revolved, and its objects are: To shield with approximate completeness, by means of a device low in cost and easily applied, those portions of shafts, revolving or designed to be revolved, which are not in bearings or covered by pulleys or other attached parts—thereby lessening greatly the danger of injury to persons working in proximity to revolving shafts, making the shielded shafts available as safe supports for workmen in the course of their work or in case of accident or emergency, lessening the danger to and from belts which without my device frequently fall upon and wind about revolving shafts, doing away with much waste of labor and material commonly caused by the winding about shafts of materials being used, manipulated, or manufactured, and securing all other advantages which may accrue through preventing contact of persons or things with revolving shafts. I attain these objects by means of the device illustrated in the accompanying drawing, in which—

Figures 1 to 7 inclusive are end views of the tube or sleeve A, hereinafter referred to as the sleeve A, which is designed to encircle, or approximately encircle, any shaft, revolving or designed to be revolved, and to cover a portion of the length thereof; and these end views, 1 to 7 inclusive, show seven of the many ways in which the sleeve A may be constructed or adapted to facilitate its being placed in position upon, or removed from, the shaft; Fig. 8 is a front elevation of a length of line or counter shafting, to several portions of which the sleeve A has been applied, with means for preventing movement of the sleeve A; Fig. 9 is a front elevation of a portion of a machine, with the sleeve A in position upon the feed-shaft shown, and with several ways indicated in which the sleeve A may be caused to retain a practically unchanging position, without either rotation or lateral movement; and Fig. 10 is an end view of the same portion of a machine shown in Fig. 9.

Similar letters refer to similar parts throughout the several views.

The sleeve A is made with an internal diameter somewhat greater than the diameter of the shaft which it is designed to approximately encircle. This makes it possible for the sleeve A to be held clear of the shaft within it, when this is desired and when a suitable holding device, capable of adjustment, is provided—thus obviating all friction between the sleeve A and the shaft within it. I prefer, however, to make the sleeve A of cardboard or other material that is light, inexpensive, and easily worked—and to have it rest upon and be supported by or in contact with the shaft within it; and the fact that the internal diameter of the sleeve A is greater than the diameter of the shaft then makes it certain that the sleeve A will have contact with the shaft for only a small part of its circumference, the rest of the sleeve A hanging or being clear of the shaft. This small contact with the shaft of a material such as that indicated produces little friction; and I further reduce this friction in most cases by treating the inner surface of the sleeve A, or by more or less completely impregnating the sleeve A, with a preparation for lessening friction, such as the preparations commonly used in the manufacture of "oilless bearings."

The sleeve A is not necessarily a round tube, but usually the tube form is most available, cheapest, and most satisfactory. The sleeve A, Fig. 1, is a complete tube, which it is possible to apply economically only when a shaft is free of all encumbrances, as when shafting is being erected or when a machine is being built. The sleeve A, Fig. 2, is a tube which has been split on one side throughout its length to permit of its being sprung over a shaft. The sleeve A, Fig. 3, is a tube which has been longitudinally bisected. The sleeve A, Fig. 4, is a tube which has been longitudinally bisected, the two halves being reunited at one side by a hinge or hinges while the longitudinal cut at the opposite side remains open. The sleeve A, Fig. 5, is a tube which has been cut longitudinally throughout its length at one extremity of its diameter and scored longitudinally throughout its length at the opposite extremity of the same diameter. The sleeve A, Fig. 6, is a sleeve formed by placing two longitudinal tube sections one within the other. The sleeve A, Fig. 7, is a sleeve which may be formed by shaping any sufficiently workable material into the form of a tube or sleeve.

In the forms shown in Figs. 2 to 5, inclusive, and in any similar forms, the sleeve A may readily be placed in position on any portion of a shaft which lies between bearings, or between pulleys, or between a bearing and a pulley or other part attached to the shaft, or between a pulley and any other part attached to the shaft; while in the forms shown in Figs. 6 and 7, or in any similar forms, the sleeve A may be formed upon any portion of a shaft such as the portions described. And in any of the forms shown in Figs. 2 to 7, inclusive, the sleeve A may, after being placed in position on a shaft, be made to have and retain practically the form of a complete tube or sleeve by being closed, or approximately closed, at its open side or sides, and prevented from spreading, by the use of clamps or clamp-dogs such as those later described herein, or by being in any other manner clamped, sewed, wired, latched, glued, sealed, bound, tied, or otherwise fastened together.

In Fig. 8 the sleeve A is shown in use on line or counter shafting. For this use the sleeve A should be made of the materials, and treated in the manner, described hereinbefore as preferable; and, after the sleeve A has been placed in position on the shaft, any longitudinal opening or openings which it has may be approximately closed, and prevented from spreading, by springing over the sleeve A any simple clamp of wire or thin flat steel, or by the use of strips of gummed tape, or in any of the other ways suggested in the preceding paragraph of this specification. The sleeve A may then be allowed to rotate loosely upon and with the shaft—for it touches the shaft in but a small part of its circumference, makes an almost negligible amount of friction, and stops readily when any considerable weight comes upon it, such as the weight of a belt which has been thrown from a pulley, or when it is leaned against, rested upon, or grasped for support by a workman. I prefer, however, to have the sleeve A so held that it will not revolve with the shaft; and for this purpose have provided the means shown at B, Fig. 8, hereinafter referred to as the clamp-dog B. The clamp-dog B is a clamp approximately encircling and gripping the sleeve A and having a projecting arm which finds lodgment and thus stops further rotation of the sleeve A. In Fig. 8 one specimen of the clamp-dog B is shown as having found lodgment against the portion of the hanger N which is above the shaft, while a second specimen is shown as having found lodgment against the bottom-most portion of the hanger M, below the shaft. A third form, which is little more than a simple clamp approximately encircling the sleeve A, is shown in Fig. 8 as attached by a link of wire or cord to the girder X—this connection of the clamp-dog B with a fixed object, the girder X, likewise serving to stop rotation of the sleeve A. Also, the clamp-dog B may be constructed on lines similar to those which it has in Figs. 9 and 10, its long projecting end stopping rotation of the sleeve A by finding lodgment against some adjacent part of the premises or equipment. In brief, the construction of the clamp-dog B may always be varied so that it will find lodgment against, or be connected with some available stationary object, thus stopping rotation of the sleeve A. Also, lodgment of the clamp-dog B against a shaft running parallel to the shaft E, Fig. 8, will accomplish the same result of stopping rotation of the sleeve A. It is not always necessary that the clamp-dog B shall grip the sleeve A by approximately encircling it, but I have found this to be a very satisfactory construction in most cases; and the clamp-dog B when so constructed is not only useful in preventing rotation of the sleeve A but also holds approximately closed, or assists in holding approximately closed, any longitudinal opening or openings in the sleeve A. If the closing of such openings in the sleeve A has been otherwise provided for, however, or if there are no such openings in the sleeve A, the clamp-dog B may grip the sleeve A, or be attached to it, in any way that may seem preferable. On a line or counter shaft it is not often necessary to make special provision for preventing lateral movement of the sleeve A, which usually occupies the space between a pulley and a bearing, or between some other two fixed points on the shaft which prevent it from moving to any considerable extent laterally, as between the pulley C and the hanger N, Fig. 8; but, when it is desirable on line or counter shafting to have the clamp-dog B prevent lateral movement of the sleeve A, this may be accomplished in any one of the ways indicated in the construction and application of the clamp-dog B as shown in Figs. 9 and 10 and later described herein.

The use of my device on line or counter shafting provides hitherto unknown security to the worker whose duties require either constant or occasional proximity to such shafting. His clothing cannot catch upon and wind about the shielded shaft; belts cannot wind about the shielded shaft and strike or entangle him; he may lean against or partially rest upon the shielded shaft in safety; and in emergency he may throw his arm over the shielded shaft, or clasp his hands about it, and hang from it. Even if the sleeve A normally revolves with the shaft, any very slight force is sufficient to stop its rotation; and, whether the sleeve A is held from rotating by the clamp-dog B or not, in emergency it is always stationary in the grasp of the workman, despite the continued revolving of the shaft within it. Serious accidents such as are now frequently caused by revolving shafts may thus be avoided. On the machine a part of which is shown in Figs. 9 and 10, threads are manipulated; and these threads very frequently fall upon the feed-shaft L, or upon some other shaft, and wind about it, causing much loss of time, material, and production. Losses of this character occur to a greater or less extent on most machines which make or manipulate threads—and my device may be used to great advantage on practically all of them, as well as on many machines making or manipulating other materials.

In Figs. 9 and 10 the clamp-dog B holds the sleeve A from opening or spreading, and prevents its rotation, in much the same manner as shown in Fig. 8 or described in referring to Fig. 8; but in Figs. 9 and 10 the clamp-dog B assists also in preventing lateral movement of the sleeve A. Threads are especially likely to wind about the feed-shaft L, Fig. 9, close to the feed-roller R— and for this reason it is desirable to have the sleeve A held close to the feed-roller R. In order to so hold the sleeve A close against the feed-roller R, the clamp-dog B, Fig. 9, is drawn along the sleeve A until its projecting ends meet the upright G, which upright G may be any part of the machine or attachment thereto, or any upright adjacent to the machine, which it may be convenient to use for the purpose. The sleeve A is thus held as snugly as may be desired against the feed-roller R, which feed-roller prevents it from moving laterally to the left while the clamp-dog B, through its contact with the upright G, prevents it from moving laterally to the right; and at the same time the lodgment of the long end of the clamp-dog B against the horizontal F prevents rotation of the sleeve A. The same result of preventing both rotation and lateral movement of the sleeve A may be achieved by having a fork such as the fork P in an end of the clamp-dog B straddle the upright G; or by having such a fork as the fork P engage the pin S in the horizontal F; or by having an end of the clamp-dog B set into the notch T in the horizontal F; or by making the clamp-dog B with an arm projecting in a direction approximately parallel to the feed-shaft L; or by following out the same idea in other ways. The horizontal F may be a part of the machine or some part of the premises or equipment adjacent to the machine. The clamp-dog B is shown in Figs. 9 and 10 as holding approximately closed a longitudinal opening in the sleeve A; but when the sleeve A is a closed tube, or when the opening or openings have been closed in some other of the ways suggested herein, a member adapted to prevent rotation of the sleeve, or longitudinal movement thereof, or both, may be secured to the sleeve in any desired manner. Also the clamp-dog B may be so formed that it will prevent both rotation and lateral movement of the sleeve A by lodgment only against the upright G, or by lodgment only against the horizontal F—although as shown in Figs. 9 and 10 it is relying for its effectiveness partly on its lodgment against the upright G and partly on its lodgment against the horizontal F. Also, rotation and lateral movement of the sleeve A may be prevented by using a link of wire or cord to suitably connect the clamp-dog B, or the sleeve A itself, with any suitable adjacent stationary part of the machine, building or the like. The feed-shaft L may be any shaft, and the feed-roller R may be any bearing of any shaft, or any pulley or other part against which it may be desired to closely hold the sleeve A.

I believe that my invention is new and useful because it supplies a cheap and readily applicable shield to cover approximately the whole of the circumference of a shaft; because it may rest upon or be in contact with a shaft when said shaft is revolving, thus making costly supporting structures and delicate adjustments unnecessary; and because it provides a new safeguard, for men and materials, against dangers from which they have hitherto been protected inadequately or not at all.

I do not wish to limit myself to the specific constructions shown or described of either the sleeve A or the clamp-dog B; or to the particular combinations shown or described of the sleeve A with the clamp-dog B; or to the particular combinations shown or described of the sleeve A and the clamp-dog B with the shaft and with any objects used as lodgment for the clamp-dog B in order to restrain the sleeve A; as such constructions and such combinations are capable of many variations, and must necessarily be much varied, to meet differing conditions; but

I claim—

1. A sleeve adapted to be placed and to rest upon a rotatable shaft so that the sleeve and shaft may have relative rotative movement, and means applied to the sleeve to prevent it from turning with the shaft, substantially as set forth.

2. A sleeve adapted to be placed and to rest upon a rotatable shaft so that the sleeve and shaft may have relative rotative movement, and means applied to the sleeve to hold it against turning and against lengthwise movement, substantially as set forth.

3. A sleeve adapted to be placed and to rest upon a rotatable shaft, and means projecting from said sleeve and adapted to prevent rotation thereof by contact with a stationary object, substantially as set forth.

4. A sectional sleeve adapted to be placed and to rest upon a rotatable shaft, and a member comprising a clamp to clamp the sections of the sleeve together and an arm adapted to extend into contact with a stationary object and to thereby prevent rotation of the sleeve, substantially as set forth.

HENRY J. TYNAN.

Witnesses:
I. M. TYNAN,
A. E. TYNAN.

Copies of this patent may be obtained for five cents each, by addressing the "Commissioner of Patents, Washington, D. C."